(12) United States Patent
Dodge et al.

(10) Patent No.: US 10,914,405 B2
(45) Date of Patent: Feb. 9, 2021

(54) INSULATED RISER CLAMP

(71) Applicant: HYDRA-ZORB, Auburn Hills, MI (US)

(72) Inventors: Robert Dodge, Birmingham, MI (US); Mark Schwager, Shelby Township, MI (US)

(73) Assignee: ZSI, INC., Canton, MI (US)

( * ) Notice: Subject to any disclaimer, the term of this patent is extended or adjusted under 35 U.S.C. 154(b) by 0 days.

(21) Appl. No.: 16/090,277

(22) PCT Filed: Mar. 30, 2017

(86) PCT No.: PCT/US2017/024957
§ 371 (c)(1),
(2) Date: Oct. 1, 2018

(87) PCT Pub. No.: WO2017/173045
PCT Pub. Date: Oct. 5, 2017

(65) Prior Publication Data
US 2019/0113154 A1 Apr. 18, 2019

Related U.S. Application Data

(60) Provisional application No. 62/315,046, filed on Mar. 30, 2016.

(51) Int. Cl.
*F16L 3/10* (2006.01)
*F16L 59/135* (2006.01)
*F16L 5/00* (2006.01)

(52) U.S. Cl.
CPC ............... *F16L 3/1016* (2013.01); *F16L 3/10* (2013.01); *F16L 5/00* (2013.01); *F16L 59/135* (2013.01)

(58) Field of Classification Search
CPC . F16L 5/00; F16L 3/1016; F16L 17/04; F16L 17/06; F16L 19/00; F16L 59/135; F16L 3/10
USPC .......... 248/62, 58, 65, 74.1, 74.4; 285/123.4
See application file for complete search history.

(56) References Cited

U.S. PATENT DOCUMENTS

| 863,887 | A | * | 8/1907 | Stuttle | F16L 21/06 |
| | | | | | 285/373 |
| 2,784,988 | A | * | 3/1957 | Banchback | E21B 33/04 |
| | | | | | 285/123.4 |
| 4,804,158 | A | * | 2/1989 | Collins | F16L 59/135 |
| | | | | | 248/74.4 |
| 5,445,538 | A | * | 8/1995 | Rodrigues | H01R 13/5812 |
| | | | | | 439/460 |

(Continued)

*Primary Examiner* — Nkeisha Smith
(74) *Attorney, Agent, or Firm* — Harness, Dickey & Pierce, P.L.C.

(57) ABSTRACT

A riser clamp assembly for receiving and supporting an insulated pipe. The clamp assembly includes a first riser clamp and a second riser clamp. Each of the riser clamps includes a semi-circular body portion extending arcuately between opposite first and second ends and defining an inner cylindrical wall and an outer cylindrical wall extending axial between top and bottom edges. A generally C-shaped flange projects radially from the inner cylindrical wall generally midway between the top and bottom edges to define an axial center opening. A support brace extends radially from the outer cylindrical wall adjacent each end of the body portion for interconnecting the first and second riser clamps around the insulated pipe.

6 Claims, 5 Drawing Sheets

(56) References Cited

U.S. PATENT DOCUMENTS

| | | | |
|---|---|---|---|
| 7,010,889 B1* | 3/2006 | Renfro | F16L 3/1091 |
| | | | 138/106 |
| 7,500,643 B2* | 3/2009 | Leone | F16L 3/10 |
| | | | 248/56 |
| 7,625,017 B1* | 12/2009 | Radzik | F16L 17/04 |
| | | | 285/368 |
| 7,805,816 B1 | 10/2010 | Thorne et al. | |
| 7,861,983 B2* | 1/2011 | Lange | F16L 59/135 |
| | | | 138/106 |
| 8,047,476 B2* | 11/2011 | Van Walraven | F16L 3/1016 |
| | | | 248/74.4 |
| 8,276,854 B2* | 10/2012 | Mominee | F16L 5/00 |
| | | | 248/62 |
| 8,759,682 B2* | 6/2014 | Devouge | F16L 3/12 |
| | | | 174/135 |
| 8,833,706 B2* | 9/2014 | Elsmore | H02G 3/32 |
| | | | 138/106 |
| 9,004,545 B2* | 4/2015 | Whitaker | A61M 39/1011 |
| | | | 285/419 |
| 9,175,799 B2* | 11/2015 | Clark | F16L 55/179 |
| 9,488,201 B2* | 11/2016 | Sumners | F16L 59/135 |
| 10,344,538 B2* | 7/2019 | Reynolds | E21B 15/00 |
| 2002/0108662 A1 | 8/2002 | Opperthauser | |
| 2007/0261884 A1 | 11/2007 | Smith | |
| 2008/0011933 A1 | 1/2008 | Railsback | |
| 2012/0032044 A1* | 2/2012 | Ruiz Rincon | B62D 25/145 |
| | | | 248/205.3 |
| 2013/0257045 A1* | 10/2013 | Mikami | F16L 17/04 |
| | | | 285/364 |
| 2016/0010771 A1* | 1/2016 | Cheng-Sheng | F16L 17/04 |
| | | | 285/355 |
| 2017/0191588 A1* | 7/2017 | Edwards | F16L 55/005 |
| 2018/0209567 A1* | 7/2018 | Brandt | F16L 17/04 |

* cited by examiner

US 10,914,405 B2

INSULATED RISER CLAMP

CROSS-REFERENCE TO RELATED APPLICATIONS

This application claims priority to and all the benefits of U.S. Provisional Application No. 62/315,046, filed on Mar. 30, 2016.

BACKGROUND OF THE INVENTION

1. Field of the Invention

The present invention relates to a riser clamp assembly. More particularly, the invention relates to an insulated riser clamp assembly adapted for securing and supporting an insulated fluid pipe through a hole in a structure.

2. Description of Related Art

Conventional pipes are used to convey or transfer fluids in various commercial and industrial application and buildings, such as water and sprinkler systems, refrigeration systems, and heating/cooling systems. The pipes are commonly encased in a cellular foam insulation tubing, which maintains the fluid within the pipes at a desired temperature. The pipe insulation tubing is commonly provided in predetermined lengths that are aligned end-to-end to cover an entire length of pipe.

In one typical application and installation, the insulated pipe, that is, the pipe encased by the insulation tubing, is disposed along a support structure, such as a ceiling of the building. The insulated pipe is commonly supported along the support structure be a plurality of spaced apart clevis hangers or straps. In another application and installation, the insulated pipe extends or passes vertically through an opening or hole in a floor of the building from one floor to another floor. The pipe extends through the hole in the floor and is typically supported by a metal bracket or pair of clamped metal brackets which support the pipe on the surface of the floor. It is desirable to encase the pipe in resilient cellular foam insulation to insulate and maintain the temperature of the fluid in the pipe. However, insulating the pipe on opposing sides of the floor creates an open gap therebetween, void of any insulation within the opening in the floor, and diminishing the insulation properties of the pipe. The gap formed by the adjacent ends of the insulation is often taped or glued by the installer which is labor intensive and inefficient.

Therefore, it remains desirable to provide a riser clamp for securing and supporting an insulated pipe through the opening in the floor.

SUMMARY OF THE INVENTION

A riser clamp assembly is provided for receiving and supporting an insulated pipe. The clamp assembly comprises a first riser clamp and a second riser clamp. Each of the riser clamps includes a semi-circular body portion extending arcuately between opposite first and second ends and defining an inner cylindrical wall and an outer cylindrical wall extending axial between top and bottom edges. A generally C-shaped flange projects radially from the inner cylindrical wall generally midway between the top and bottom edges to define an axial center opening. A support brace extends radially from the outer cylindrical wall adjacent each end of the body portion for interconnecting the first and second riser clamps around the insulated pipe.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
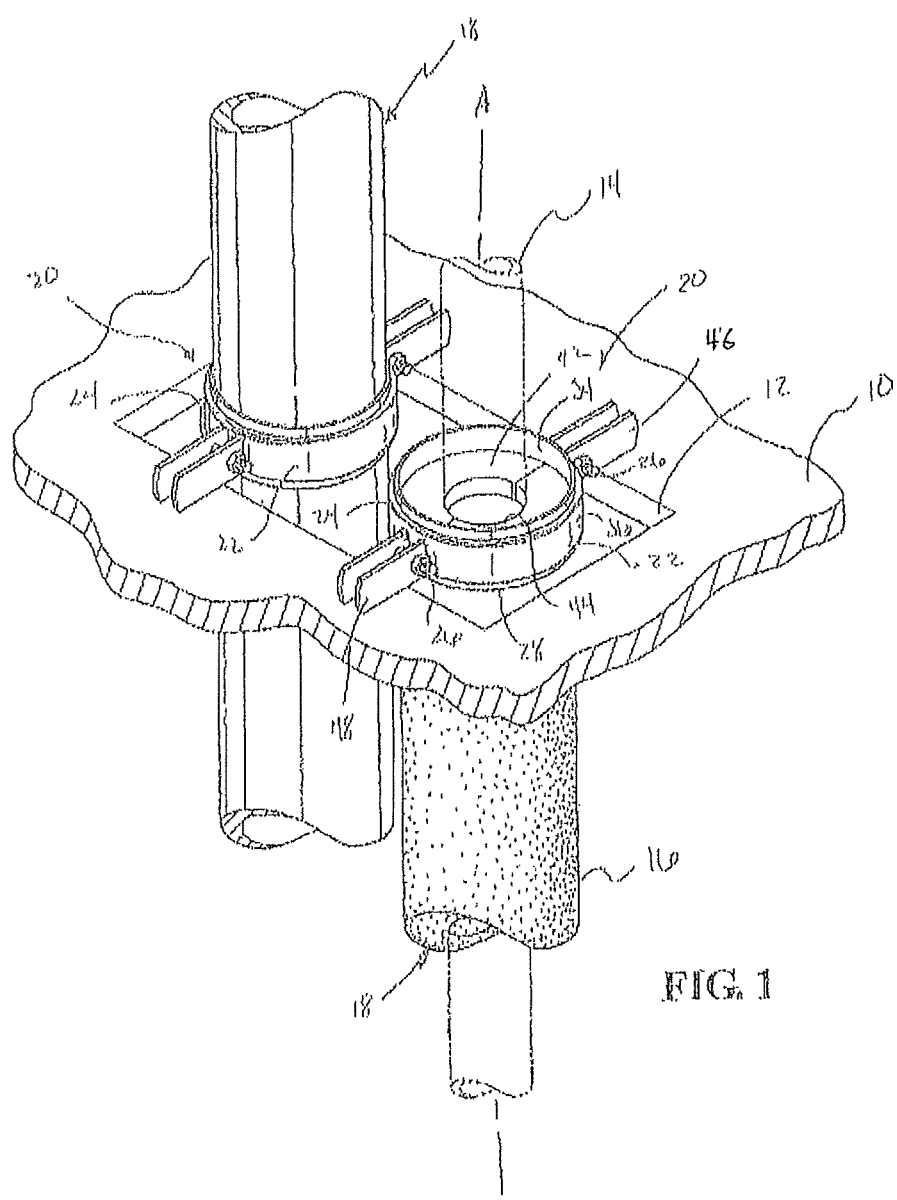
FIG. 1 is a fragmentary perspective view of a plurality of insulated riser clamp assemblies supporting insulated pipes through a hole in a floor according to one aspect of the invention.
Figure 2:
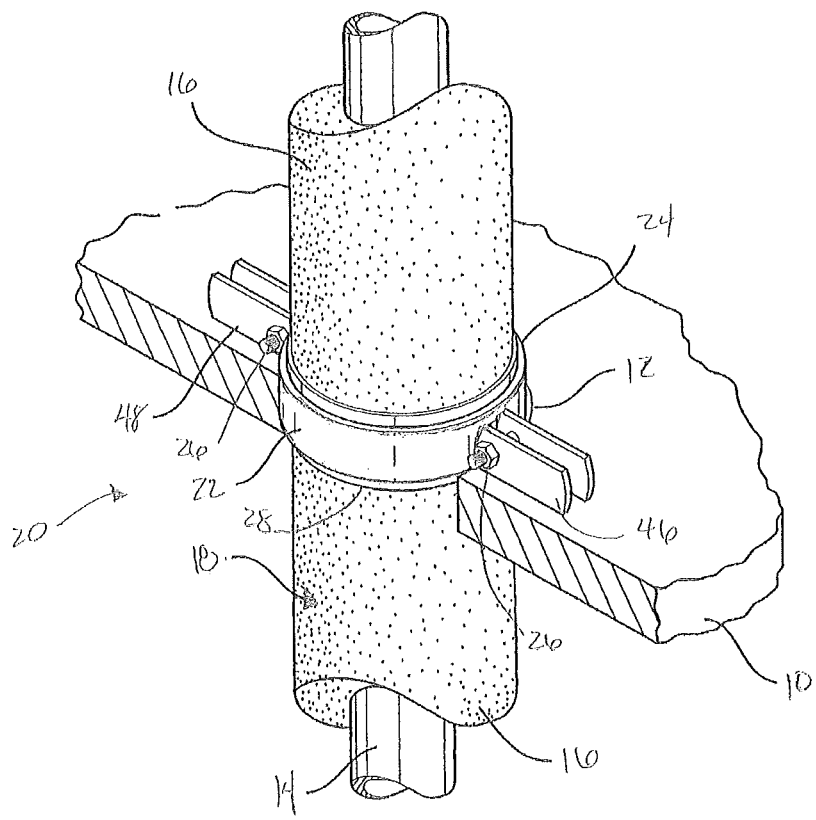
FIG. 2 is a fragmentary cross-sectional view of the floor with an insulated riser clamp assembly supporting an insulated pipe through a hole in the floor.
Figure 3:
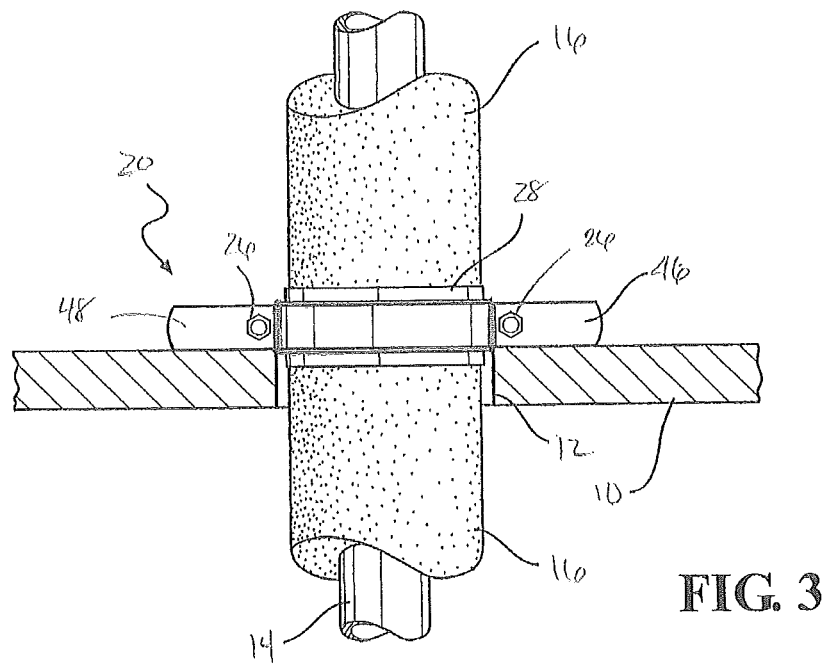
FIG. 3 is a side view of the insulated riser clamp assembly and insulated pipe of FIG. 2.
Figure 4:
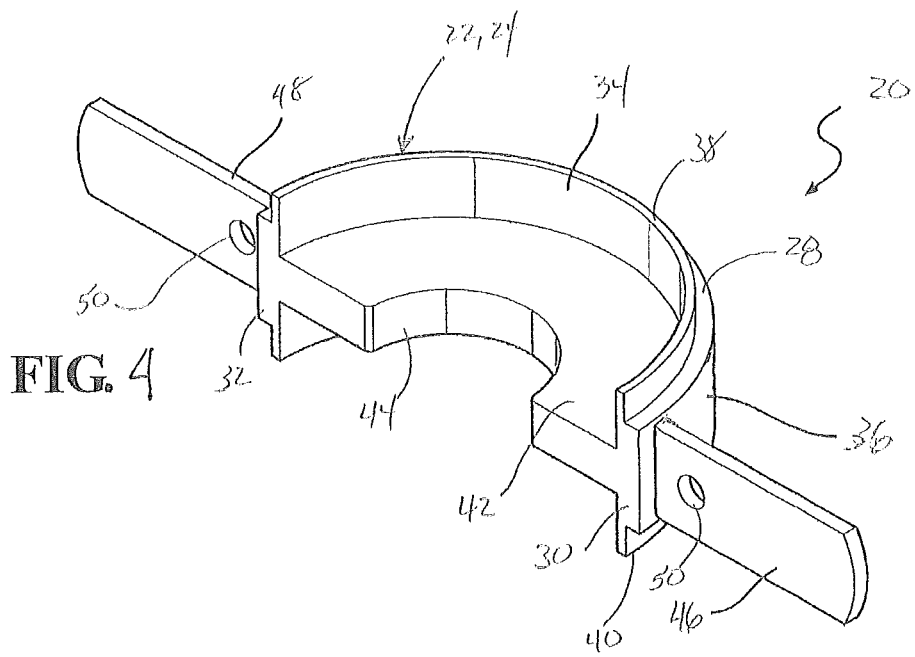
FIG. 4 is a perspective view of a first clamp of the insulated riser clamp assembly with a metal bracket overmolded with the plastic coupler.
Figure 5:
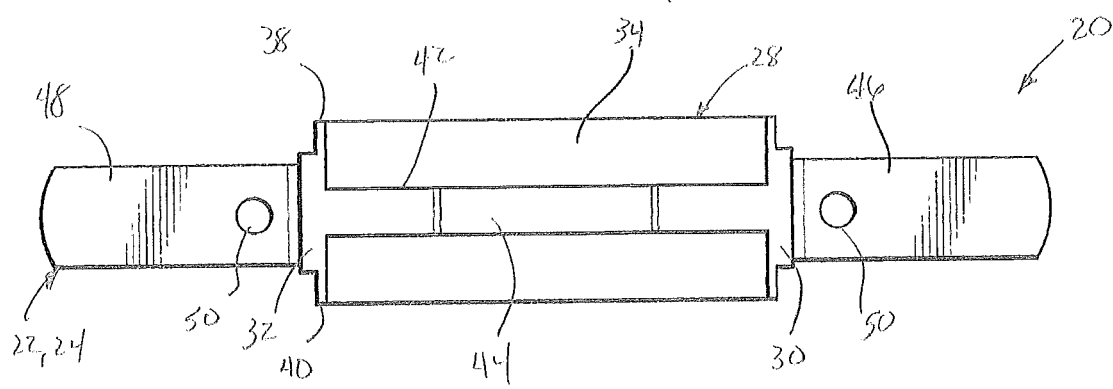
FIG. 5 is a front plan view of the clamp of FIG. 4.
Figure 6:
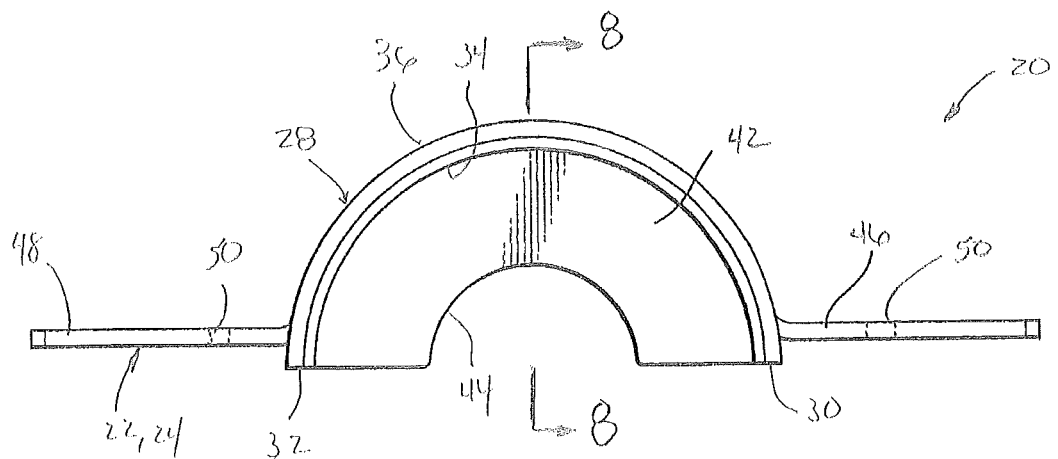
FIG. 6 is a top view of the clamp of FIG. 4.
Figure 7:
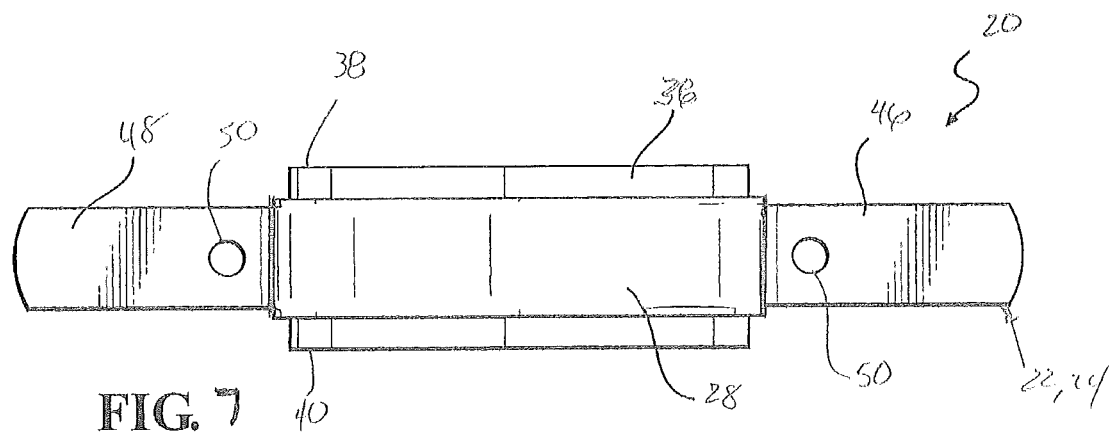
FIG. 7 is a rear plan view of the clamp of FIG. 8.
Figure 8:
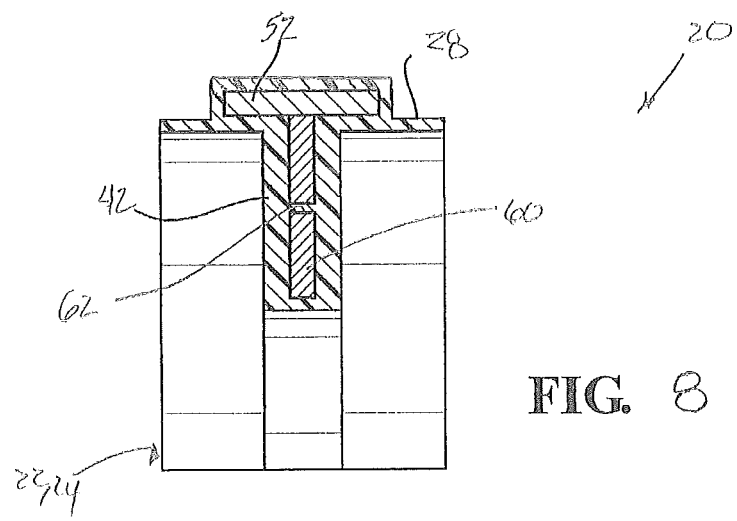
FIG. 8 is a cross-section view of the insulated riser clamp taken along line 8-8 of FIG. 6.
Figure 9:
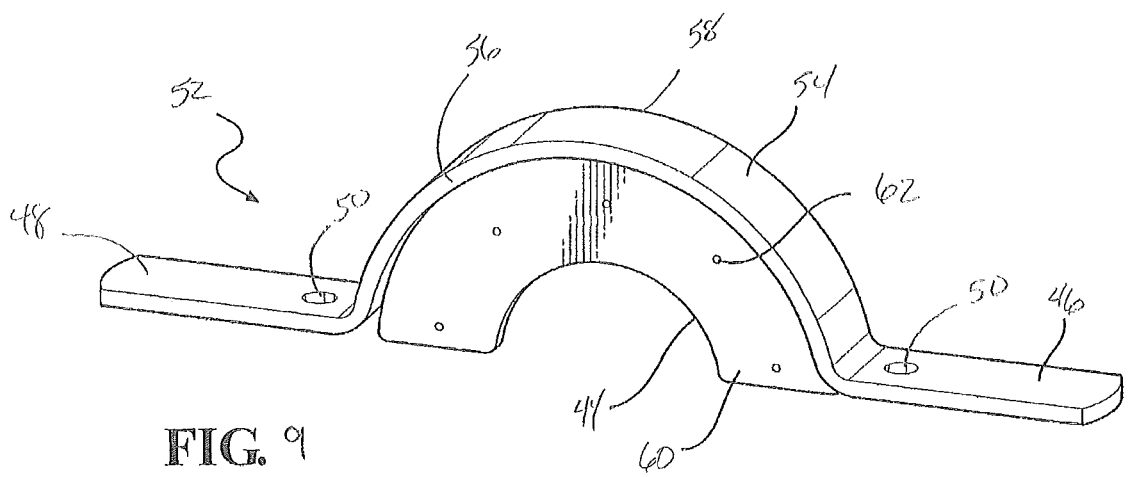
FIG. 9 is a perspective view of a metal bracket of the insulated riser clamp.
Figure 10:
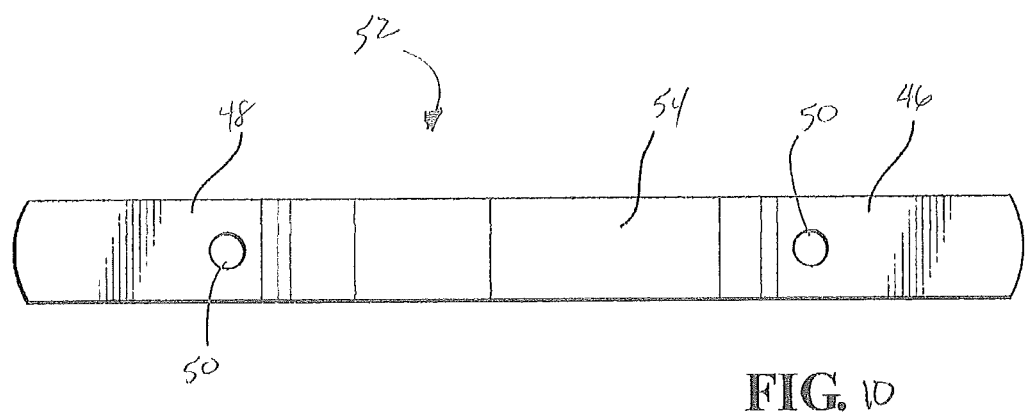
FIG. 10 is a plan view of the metal bracket of FIG. 9.
Figure 11:
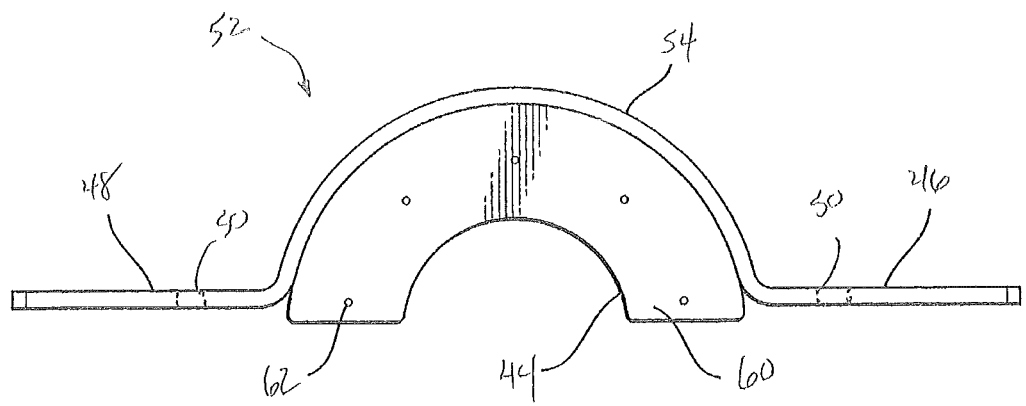
FIG. 11 is a top view of the metal bracket of FIG. 10.

Referring to the Figures, wherein like numerals indicate like or corresponding parts throughout the several views, a support structure, or floor, 10 separating adjacent floors of a building is shown having a hole, or opening, 12 to receive a pipe 14 therethrough to transfer fluid between the adjacent floors. Referring to FIGS. 1-3, the pipe 14 is generally a fluid pipe used in commercial or industrial buildings for transferring fluid in water, refrigeration, or heating/cooling systems. Further, the pipe 14 is typically encased in a resilient cellular foam insulation tubing 16 for maintaining the temperature of the fluid in the pipe 14, collectively referred to herein as an insulated pipe 18. The insulation tubing 16 is encased around the pipe 14 both above and below the floor 10 with facing ends adjacent the hole 12. According to one embodiment of the present invention, an insulated riser clamp assembly 20 fixedly secures and supports the pipe 14 and the insulation tubing 16 to the floor 10 and through the hole 12.

The insulated riser clamp assembly 20 includes first and second opposing semi-circular clamps 22, 24 which may be interconnected by fasteners or bolts 26 around the insulated pipe 18 to support and secure both the pipe 14 and the ends of the insulation tubing 16. The first and second semi-circular clamps 22, 24 are mirror images and therefore only one clamp 22 will be described in detail. However, it should be appreciated that the clamps 22, 24 are the same and are joined together by bolts 26 in mating facing engagement to form the clamp assembly 20.

Referring to FIGS. 1-7, each clamp 22, 24 includes a semi-circular or U-shaped body portion 28 extending arcuately between opposite first and second ends 30, 32. The body portion 28 includes parallel inner cylinder wall 34 and an outer cylinder wall 36 extending axial between a top edge 38 and opposite bottom edge 40. An inner semi-circular or C-shaped flange 42 projects radially inwardly, that is towards a center axis A, from the inner wall 34 of the body 28 and positioned approximately midway between the top and bottom edges 38, 40 forming a center opening 44 when the first and second clamps 22, 24 are facing and mated together for receiving the pipe 14 therethrough. The clamp 22 further includes first and second elongated support braces 46, 48 projecting radially from the body portion 28 adjacent each of the respective first and second ends 30, 32. Each brace 46, 48 includes at least one bore 50 therethrough for receiving the bolts 26 to fixedly interconnect the facing clamps 22, 24 around the insulated pipe 18.

Referring to FIGS. 8-11, the clamps 22, 24 of the preferred embodiment include a metal bracket at least partially overmolded with a plastic shell to form the clamps 22, 24. More specifically, each clamp 22, 24 includes a metal bracket 52 having a semi-circular or arcuate shaped body 54 with flared ends projecting outwardly from each of the opposing ends thereof and defining the first and second support braces 46, 48. The body 54 extends axial between a top edge 56 and a bottom edge 58. An inner semi-circular or C-shaped flange 60 projects radially inwardly, that is towards the center axis A, from the inner surface of the body 54 and is positioned approximately midway between the top and bottom edge 56, 58. The flange 60 includes a plurality of spaced apart axial through-holes 62 therethrough for mechanically bonding with the overmolded plastic material. That is, referring to FIG. 8, the body 54 of the metal bracket 52 is overmolded with plastic material to encapsulate both the body 54 and the flange 60 in a plastic sleeve while the support braces 46, 48 remain exposed and projecting radially therefrom. The plastic flows through the axial through-holes 62 during the overmolding process to mechanically bond the plastic to the brackets 52 and forming an integral insulated riser clamp 22, 24.

It should be appreciated, however, that the entire bracket 52 may be overmolded with plastic material, including the support braces 46, 48 without varying from the scope of the invention. Additionally, the clamp 22, 24 may be completely molded of plastic material only or formed from the metal bracket 52 only.

Referring again to FIGS. 1-3, in operation, a pipe 14 may be passed through the hole 12 in the floor 10 between two adjacent floors of a building. The insulated riser clamp assembly 20 may then be arranged around the insulated pipe 18 wherein each clamp 22, 24 is positioned in facing mating engagement surrounding the pipe 14 such that the pipe 14 is received through the center opening 44. The bolts 26 are inserted through the bores 50 in the support braces 46, 48 and tightened to secure the clamps 22, 24 around the pipe 14. The support braces 46, 48 extend radially beyond the hole 12 in the floor 10 to support, stabilize and secure the pipe relative to the floor 10. Further, opposing ends of the insulation tubing 16 may now be inserted into the body portion 28 surrounded by the inner cylindrical wall 34 and abutting respective upper and lower side of the flange 42 for automatically sealing the gap between opposing ends of the insulation tubing 16 extending through the hole 12 in the floor 10 and creating a clean seal and vapor barrier therebetween without the need for glue or tape.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A riser clamp assembly adapted for receiving and supporting an insulated pipe, said assembly comprising:
   a first riser clamp, and
   a second riser clamp;
   wherein each of said riser clamps comprises:
      a semi-circular body portion extending arcuately between opposite first and second ends and defining an inner cylindrical wall and an outer cylindrical wall extending axially between top and bottom edges,
      wherein said semi-circular body portion includes a generally C-shaped metal body,
      a generally C-shaped flange projecting radially from said inner cylindrical wall generally midway between said top and bottom edges to define an axial center opening,
      wherein said C-shaped flange extends radially more than it extends axially and said C-shaped flange extends from said first end to said second end,
      said C-shaped flange includes a generally C-shaped metal flange extending radially inwardly from said C-shaped metal body,
      said C-shaped metal body and said C-shaped metal flange are overmolded with plastic, and
      said C-shaped metal flange includes a plurality of spaced apart axial through-holes for mechanically bonding said plastic with said C-shaped metal flange, and
      a support brace extending radially from said outer cylindrical wall adjacent each end of said body portion for interconnecting said first and second riser clamps around the insulated pipe,
         wherein the C-shaped metal body extends arcuately between opposite ends defined by said support brace.

2. The riser clamp assembly as set forth in claim 1 wherein each of said support brace includes a bore therethrough for receiving a fastener for interconnecting said first and second clamp around the insulated pipe.

3. A riser clamp assembly adapted for receiving and supporting an insulated pipe, said assembly comprising:
   a first riser clamp and
   a second riser clamp;
   wherein each of said riser clamps comprises:
      a semi-circular body portion extending arcuately between opposite first and second ends and defining an inner cylindrical wall and an outer cylindrical wall extending axially between top and bottom edges;
      a generally C-shaped flange projecting radially from said inner cylindrical wall generally midway between said top and bottom edges to define an axial center opening wherein said flange extends from said first end to said second end; and
      a support brace extending radially from said outer cylindrical wall adjacent each end of said semi-circular body portion for interconnecting said first and second riser clamps around the insulated pipe; and
   wherein said semi-circular body portion includes a generally C-shaped metal body extending arcuately between opposite ends defined by said support brace extending radially from said body, said C-shaped flange includes a generally C-shaped metal flange extending radially inwardly from said C-shaped metal body, said C-shaped metal body and said C-shaped metal flange are overmolded with plastic, and said C-shaped metal flange includes a plurality of spaced apart axial through-holes for mechanically bonding said plastic with said C-shaped metal flange.

4. The riser clamp assembly as set forth in claim 3 wherein each of said support brace includes a bore therethrough for receiving a fastener for interconnecting said first and second clamp around the insulated pipe.

5. In combination, a riser clamp assembly and an insulated pipe:

said riser clamp assembly comprising:
- a first riser clamp, and
- a second riser clamp; wherein
  - each of said riser clamps including a semi-circular body portion extending arcuately between opposite first and second ends and defining an inner cylindrical wall and an outer cylindrical wall extending axially between top and bottom edges, wherein said semi-circular body portion includes a generally C-shaped metal body,
  - a generally C-shaped flange projecting radially from said inner cylindrical wall generally midway between said top and bottom edges to define an axial center opening, wherein
    - said C-shaped flange extends from said first end to said second end,
    - said C-shaped flange includes a generally C-shaped metal flange extending radially inwardly from said C-shaped metal body,
  - said C-shaped metal body and said C-shaped metal flange are overmolded with plastic,
  - said C-shaped metal flange of said metal bracket includes a plurality of spaced apart axial through-holes for mechanically bonding said plastic with said C-shaped metal flange, and
  - a support brace extending radially from said outer cylindrical wall adjacent each end of said body portion for interconnecting said first and second riser clamps around said insulated pipe,
    - wherein the C-shaped metal body extends arcuately between opposite ends defined by said support brace;

said insulated pipe comprising:
- a pipe,
- a first insulation tubing encased around said pipe and extending longitudinally between opposite ends, and
- a second insulation tubing encased around said pipe and extending longitudinally between opposite ends;

wherein each of said riser clamps is positioned in mating engagement surrounding said pipe and said pipe extends through said axial center openings, and wherein facing ends of said first and second insulation tubings are inserted into said body portions surrounded by said inner cylindrical walls and abutting opposite sides of said flanges.

6. The combination as set forth in claim 5 wherein each of said support brace includes a bore therethrough for receiving a fastener for interconnecting said first and second clamp around said insulated pipe.

\* \* \* \* \*